United States Patent
Nassouri et al.

(10) Patent No.: US 10,197,157 B2
(45) Date of Patent: Feb. 5, 2019

(54) SYSTEM AND METHOD FOR CONTROLLING A CONTINUOUSLY VARIABLE TRANSMISSION

(71) Applicant: GM GLOBAL TECHNOLOGY OPERATIONS LLC, Detroit, MI (US)

(72) Inventors: Crystal J. Nassouri, West Bloomfield, MI (US); Craig J. Hawkins, Howell, MI (US); Alexander S. Barath, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 338 days.

(21) Appl. No.: 15/005,290

(22) Filed: Jan. 25, 2016

(65) Prior Publication Data
US 2017/0211700 A1    Jul. 27, 2017

(51) Int. Cl.
*F16H 61/662*    (2006.01)
*F16H 9/18*    (2006.01)
(Continued)

(52) U.S. Cl.
CPC ......... *F16H 61/66272* (2013.01); *F16H 9/18* (2013.01); *F16H 61/662* (2013.01); *F16H 59/18* (2013.01); *F16H 59/40* (2013.01); *F16H 59/42* (2013.01); *F16H 59/44* (2013.01); *F16H 59/46* (2013.01); *F16H 59/48* (2013.01);
(Continued)

(58) Field of Classification Search
CPC .......... F16H 59/18; F16H 59/36; F16H 59/40; F16H 59/42; F16H 59/44; F16H 59/46; F16H 59/48; F16H 2059/506; F16H 61/66272; F16H 2061/66218; F16H 2061/66277
See application file for complete search history.

(56) References Cited

U.S. PATENT DOCUMENTS 4,733,582 A * 3/1988 Eggert ................. F16H 47/065
474/28
5,004,082 A * 4/1991 Sakakibara ............ F16D 47/06
192/3.26
(Continued)

FOREIGN PATENT DOCUMENTS

CN    101561043 A    10/2009
CN    101846183 A    9/2010
JP    2001330127 A    11/2001

*Primary Examiner* — Edwin A Young
(74) *Attorney, Agent, or Firm* — Quinn IP Law (57) ABSTRACT

A continuously variable transmission (CVT) for a vehicle includes an input member, an output member and a variator assembly including a first pulley rotatably coupled to the input member and a second pulley rotatably coupled to the output. The first and second pulleys are rotatably coupled by a flexible continuous rotatable device. A control system is provided including an instruction set executable to determine an initial variator speed ratio of the variator assembly and detect an event causing a change in an operational state of the vehicle. The control system determines a compensation strategy to adjust the variator speed ratio in response to the change in the operational state of the vehicle and generates an adjusted variator speed ratio based upon the compensation strategy. The control system transmits the adjusted variator speed ratio to the variator assembly.

17 Claims, 2 Drawing Sheets

(51) Int. Cl.
*F16H 59/18* (2006.01)
*F16H 59/40* (2006.01)
*F16H 59/42* (2006.01)
*F16H 59/44* (2006.01)
*F16H 59/46* (2006.01)
*F16H 59/48* (2006.01)
*F16H 59/36* (2006.01)
*F16H 59/50* (2006.01)

(52) U.S. Cl.
CPC .. *F16H 2059/363* (2013.01); *F16H 2059/366* (2013.01); *F16H 2059/443* (2013.01); *F16H 2059/506* (2013.01); *F16H 2061/66204* (2013.01); *F16H 2061/66277* (2013.01)

(56) References Cited

U.S. PATENT DOCUMENTS 5,334,102 A * 8/1994 Sato ................. F16H 61/12
                                            474/18
2004/0127313 A1* 7/2004 Shimanaka ....... F16H 61/66272
                                            474/18

* cited by examiner

SYSTEM AND METHOD FOR CONTROLLING A CONTINUOUSLY VARIABLE TRANSMISSION

TECHNICAL FIELD

The present disclosure pertains to a continuously variable transmission (CVT) and a method for controlling the CVT.

BACKGROUND

A continuously variable transmission (CVT) is a type of power transmission that is capable of continuously changing an output/input speed ratio over a range between a minimum (underdrive) ratio and a maximum (overdrive) ratio, thus permitting infinitely variable selection of engine operation that achieves a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system.

The pulley system, which is commonly referred to as a variator assembly, can transition anywhere within the calibrated range of speed ratios. A typical variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly depending on the configuration.

In order to vary a CVT speed ratio, a clamping force may be applied to the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This in turn changes the effective diameters of the variator pulleys and varies the speed ratio of the CVT.

SUMMARY

A system for controlling a continuously variable transmission (CVT) for a vehicle includes a CVT having an input member, an output member and a variator assembly including a first pulley rotatably coupled to the input member and a second pulley rotatably coupled to the output. The first and second pulleys are rotatably coupled by a flexible continuous rotatable device.

A control system having at least one controller and one or more sensors in communication with the at least one controller is provided including an instruction set executable to determine an initial variator speed ratio of the variator assembly and detect an event causing a change in an operational state of the vehicle. The control system determines a compensation strategy to adjust the variator speed ratio in response to the change in the operational state of the vehicle and generates an adjusted variator speed ratio based upon the compensation strategy. The control system transmits the adjusted variator speed ratio to the variator assembly.

In one embodiment of the disclosure, a method for controlling a vehicle continuously variable transmission (CVT) including a variator assembly comprises the steps of monitoring an operational state of the vehicle with a control system having at least one controller and one or more sensors in communication with the at least one controller and determining an initial variator speed ratio of the variator assembly. The control system detects an event causing a change in the operational state of the vehicle and determines a compensation strategy with the control system to adjust the variator speed ratio in response to the change in the operational state of the vehicle.

The control system generates the adjusted variator speed ratio and transmits the adjusted variator speed ratio responsive to the compensation strategy in response to the event change in the operational state of the vehicle to the variator assembly. The control system may monitor at least one vehicle operation state from a group consisting of vehicle speed, engine speed, torque converter turbine speed, CVT variator input speed, CVT variator output speed, brake pedal actuation, accelerator pedal actuation, transmission control module (TCM) gear state, vehicle acceleration, engine acceleration and wheel speed. The control system may detect at least one event causing a change in the operational state of the vehicle from the group consisting of a generalized road disturbance, a loss of wheel traction, a sudden deceleration of the vehicle and a rolling change of direction of the vehicle.

In another embodiment of the disclosure, the control system generates a compensation strategy in response to the change in the operational state of the vehicle by detecting vehicle acceleration in response to the vehicle interacting with a generalized road disturbance event with the one or more sensors in a predefined time interval until the predefined time interval is reached. The control system generates the adjustment to the initial variator speed ratio by overclamping a variator belt to limit the variator ratio and maintains the adjusted variator speed ratio responsive to the compensation strategy until cessation of the generalized road disturbance event.

In yet another embodiment of the disclosure, the control system generates a compensation strategy in response to the change in the operational state of the vehicle by detecting wheel speed in response to a loss of wheel traction event with the one or more sensors in a predefined time interval until the predefined time interval is reached. The control system generates the adjustment to the initial variator speed ratio by overclamping a variator belt to limit the variator ratio and maintains the adjusted variator speed ratio responsive to the compensation strategy until cessation of the loss of wheel traction event.

The control system may detect a differential between wheel speeds with the one or more sensors to determine if a threshold has been exceeded between the driven and nondriven wheels. The control system may also detect individual wheel speeds and vehicle acceleration with the one or more sensors to identify a loss of wheel traction event.

In another embodiment of the disclosure, the control system generates a compensation strategy in response to the change in the operational state of the vehicle by detecting brake pedal actuation, rate of change of the brake pedal actuation and transmission turbine speed in response to a vehicle deceleration event with the one or more sensors at a time of entry of a predefined time interval until the predefined time interval is reached. The control system generates the adjustment to the initial variator speed ratio to a predefined minimum variator speed ratio and maintains the adjusted variator speed ratio responsive to the compensation strategy until cessation of the vehicle deceleration event.

In yet another embodiment of the disclosure, the control system generates a compensation strategy in response to the change in the operational state of the vehicle by monitoring a transmission control module to determine a transmission mode and vehicle speed in response to a rolling direction change event with the one or more sensors in a predefined time interval until the predefined time interval is reached. The control system generates an adjustment to the initial variator speed ratio by transmitting a drive/reverse clutch lockout signal to the clutch and maintains the reduction in the variator speed ratio responsive to the compensation strategy until cessation of the rolling direction change event.

The control system may monitor the transmission control module to identify if the transmission is placed in a drive mode when the vehicle speed is negative below a calibratable threshold. Alternatively, the control system may monitor the transmission control module to identify if the transmission is moved from a neutral mode to a drive mode or a reverse mode when either high accelerator pedal actuation or high engine speed conditions are detected by the one or more sensors of the control system.

In another embodiment of the disclosure, a vehicle comprises an internal combustion engine and a continuously variable transmission (CVT) having an input member and an output member. A variator assembly including a first pulley and a second pulley, the first and second pulleys rotatably coupled by a flexible continuous rotatable device, wherein the first pulley is rotatably coupled to an input member and the second pulley is rotatably coupled to an output member.

The first pulley includes a moveable sheave that is translated along a first axis relative to a stationary sheave in response to urging of a first actuator. The second pulley includes a moveable sheave that is translated along a second axis relative to a stationary sheave in response to urging of a second actuator.

A control system having at least one controller and one or more sensors in communication with the at least one controller includes an instruction set executable to determine an initial variator speed ratio of the variator assembly and detect an event causing a change in an operational state of the vehicle. The instruction set determines a compensation strategy to adjust the variator speed ratio in response to the change in the operational state of the vehicle and generates the adjusted variator speed ratio. The control system transmits the adjusted variator speed ratio responsive to the compensation strategy in response to the event change in the operational state of the vehicle to the variator assembly.

The above noted and other features and advantages of the present disclosure are readily apparent from the following detailed description when taken in connection with the accompanying drawings.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Figure 1:
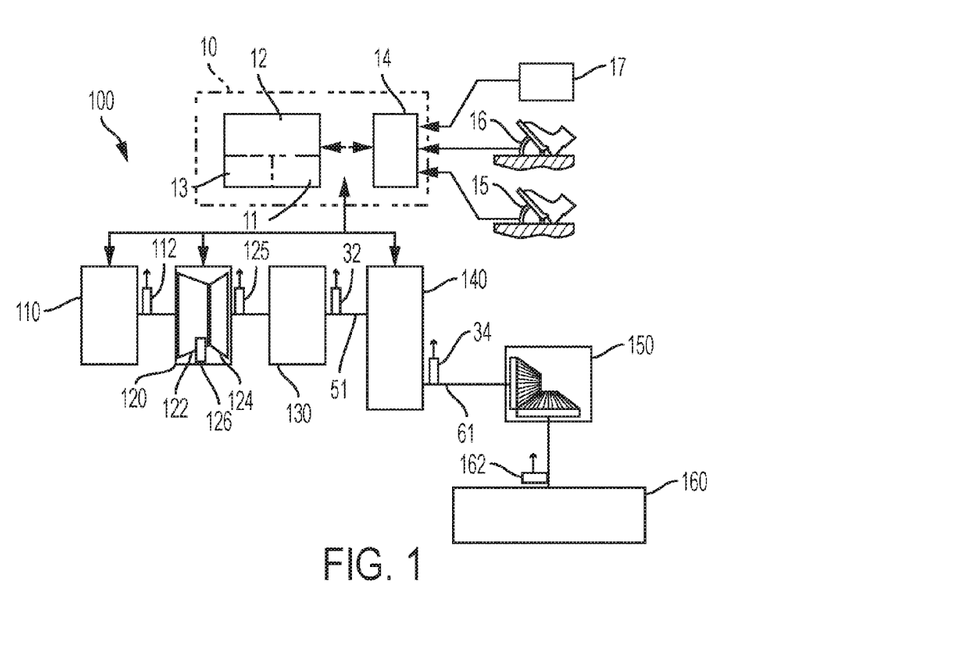
FIG. 1 is a schematic illustration of a powertrain system that includes an internal combustion engine rotatably coupled to a continuously variable transmission (CVT) via a torque converter and a gear box, in accordance with the disclosure.

Referring now to the drawings, wherein like reference numbers correspond to like or similar components throughout the several figures, FIG. 1 schematically illustrates elements of a powertrain system 100 of a vehicle that includes an internal combustion engine (engine) 110 rotatably coupled to a continuously variable transmission (CVT) 140 via a torque converter 120 and a gear box 130. The powertrain system 100 couples via a driveline 150 to one or more vehicle wheels 160 to provide tractive effort when employed on a vehicle. Operation of the powertrain system 100 may be monitored and controlled by a control system 10 in response to driver commands and other vehicle operation factors. The powertrain system 100 may be part of a device which may be a vehicle, a bicycle, a robot, farm implement, sports-related equipment or any other transportation device.

The engine 110 may be any suitable internal combustion engine capable of transforming hydrocarbon fuel to mechanical power to generate torque in response to commands originating from the control system 10. The torque converter 120 may be a device providing fluidic coupling between its input and output members for transferring torque, and preferably includes a pump 122 that is coupled to the engine 110, a turbine 124 that may be coupled via the output member to the gear box 130 and a torque converter clutch 126 that locks rotation of the pump 122 and turbine 124 and may be controllable by the control system 10.

The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. One embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gear set, a chain drive gear set or another suitable gear arrangement for transferring torque to one or more vehicle wheels 160.

The powertrain system 100 preferably includes one or more sensors or sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162. Each of the aforementioned speed sensors may be any suitable position/ speed sensing device, such as a Hall-effect sensor. Each of the aforementioned speed sensors communicates with the control system 10. As used herein the term 'speed' and related terms refer to a rotational speed of a rotating member, unless specifically indicated otherwise. As used herein the term 'position' and related terms refer to a rotational or angular position of a rotating member, unless specifically indicated otherwise.

The control system 10 preferably includes at least one controller 12 and a user interface 14. A single controller 12 is shown for ease of illustration. The controller 12 may include a plurality of controller devices wherein each of the controllers 12 may be associated with monitoring and controlling a single system. This may include an engine control module (ECM) for controlling the engine 110 and a transmission controller or transmission control module (TCM) for controlling the CVT 140 and for monitoring and controlling a single subsystem, e.g., a torque converter clutch.

The controller 12 preferably includes at least one processor and at least one memory device 11 (or any non-transitory, tangible computer readable storage medium) on which are recorded instructions for executing instruction sets for controlling the CVT and a memory cache 13. The memory device 11 can store controller-executable instruction sets, and the processor can execute the controller-executable instruction sets stored in the memory 11.

The user interface 14 communicates with and monitors operator input devices including, e.g., an accelerator pedal 15, a brake pedal 16 and a transmission gear selector 17. The user interface 14 determines an operator torque request based upon the aforementioned operator inputs. In one embodiment, the transmission gear selector 17 includes a tap-up/tap-down feature, whereby a vehicle operator may manually select a transmission gear ratio, thus overriding transmission control. A tap-up command results in a command to the CVT 140 to increase its gear ratio, which may be accomplished by increasing a speed ratio in the CVT 140. A tap-down command results in a command to the CVT 140 to decrease its gear ratio by decreasing the speed ratio in the CVT 140.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit (s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular periods of time or intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
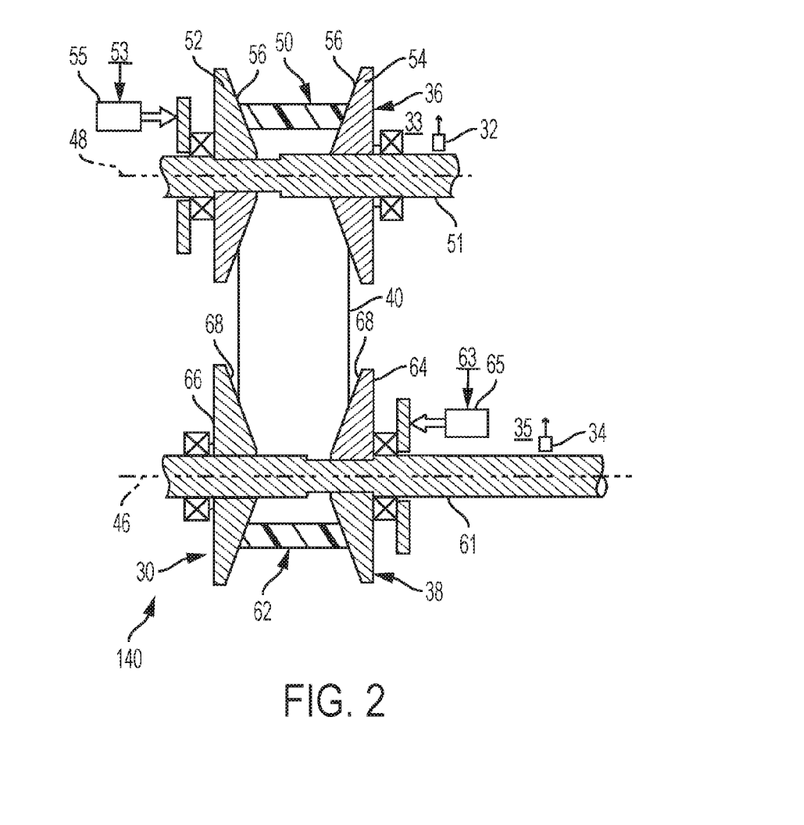
FIG. 2 schematically illustrates elements of a variator of a chain-type CVT, in accordance with the disclosure.

FIG. 2 schematically illustrates elements of a variator assembly or variator assembly 30 of a chain-type continuously variable transmission (CVT) 140 that may be advantageously controlled by a control system having at least one controller 12. The variator 30 transfers torque between the first rotating member 51 and the second rotating member 61. The first rotating member 51 is nominally referred to herein as input member 51, and the second rotating member 61 is nominally referred to herein as output member 61.

The variator assembly 30 includes a first, or primary pulley 36, a second, or secondary pulley 38 and flexible continuous rotatable device 40 that rotatably couples the first and second pulleys 36, 38 to transfer torque therebetween. The first pulley 36 rotatably attaches to the input member 51 and the second pulley 38 rotatably attaches to the output member 61, and the rotatable device 40 may be adapted to transfer torque between the first and second pulleys 36, 38 and thus between the input and output members 51, 61. The first pulley 36 and input member 51 rotate about a first axis 48, and the second pulley 38 and output member 61 rotate about a second axis 46.

The continuous rotatable device 40 can be a belt, a chain, or another suitable flexible continuous device. The input speed sensor 32 may be mounted near the input member 51 to generate a CVT input speed, represented by reference numeral 33, that relates to a speed of the first, input pulley 36, and the output speed sensor 34 may be mounted near the output member 61 to generate a CVT output speed, represented by reference numeral 35, that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque therebetween.

As used herein, the term 'speed ratio' refers to a variator speed ratio, which may be a ratio of a CVT output speed and a CVT input speed. The CVT input speed may be determined based upon a signal input from one of the engine speed sensor 112, the torque converter turbine speed sensor 125, or the input speed sensor 32, as described herein, or another suitable speed/position sensor. The CVT output speed may be determined based upon a signal input from the output speed sensor 34 or the wheel speed sensor 162 as described herein, or another suitable speed/position sensor. The speed ratio parameters are determined based upon the CVT input speed and the CVT output speed.

The first pulley 36 may be split perpendicular to the first axis 48 to define an annular first groove 50 that may be formed between a moveable sheave 52 and a stationary sheave 54. The moveable sheave 52 axially moves or translates along the first axis 48 relative to the stationary sheave 54. For example, the moveable first sheave 52 may be attached to the input member 51 via a splined connection, thereby allowing axial movement of the moveable first sheave 52 along the first axis 48. The stationary first sheave 54 may be disposed opposite the moveable first sheave 52. The stationary first sheave 54 may be axially fixed to the input member 51 along the first axis 48. As such, the stationary first sheave 54 does not move in the axial direction of the first axis 48.

The moveable first sheave 52 and the stationary first sheave 54 each include a first groove surface 56. The first groove surfaces 56 of the moveable first sheave 52 and the stationary first sheave 54 are disposed opposite each other to define the annular first groove 50 therebetween. The opposed first grooved surfaces 56 preferably form an inverted frustoconical shape such that a movement of the moveable first sheave 52 towards the stationary first sheave 54 increases an outer pulley diameter of the annular first groove 50. An actuator 55 may be arranged with the first pulley 36 to control an axial position of the moveable first sheave 52 in response to a drive signal 53, including urging the moveable first sheave 52 towards the stationary first sheave 54. In one embodiment, the actuator 55 may be a hydraulically-controlled device and the drive signal 53 may be a hydraulic pressure signal.

The second pulley 38 may be split perpendicular to the second axis 46 to define an annular second groove 62 therebetween. The annular second groove 62 may be disposed perpendicular to the second axis 46. The second pulley 38 includes a moveable sheave 64 and a stationary sheave 66. The moveable sheave 64 axially moves or translates along the second axis 46 relative to the stationary sheave 66. For example, the moveable second sheave 64 may be attached to the output member 61 via a splined connection, thereby allowing axial movement of the moveable second sheave 64 along the second axis 46.

The stationary second sheave 66 may be disposed opposite the moveable second sheave 64. The stationary second sheave 66 may be axially fixed to the output member 61 along the second axis 46. As such, the stationary second sheave 66 does not move in the axial direction of the second axis 46. The moveable second sheave 64 and the stationary second sheave 66 each include a second groove surface 68. The second groove surfaces 68 of the moveable second sheave 64 and the stationary second sheave 66 are disposed opposite each other to define the annular second groove 62 therebetween.

The opposed second grooved surfaces 68 preferably form an inverted frustoconical shape such that a movement of the moveable second sheave 64 towards the stationary second sheave 66 increases an outer pulley diameter of the annular second groove 62. An actuator 65 may be arranged with the second pulley 38 to control an axial position of the moveable second sheave 64 in response to a driven signal 63, including urging the moveable second sheave 64 towards the stationary second sheave 66. In one embodiment, the actuator 65 may be a hydraulically-controlled device and the driven signal 63 may be a hydraulic pressure signal. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

Figure 3:
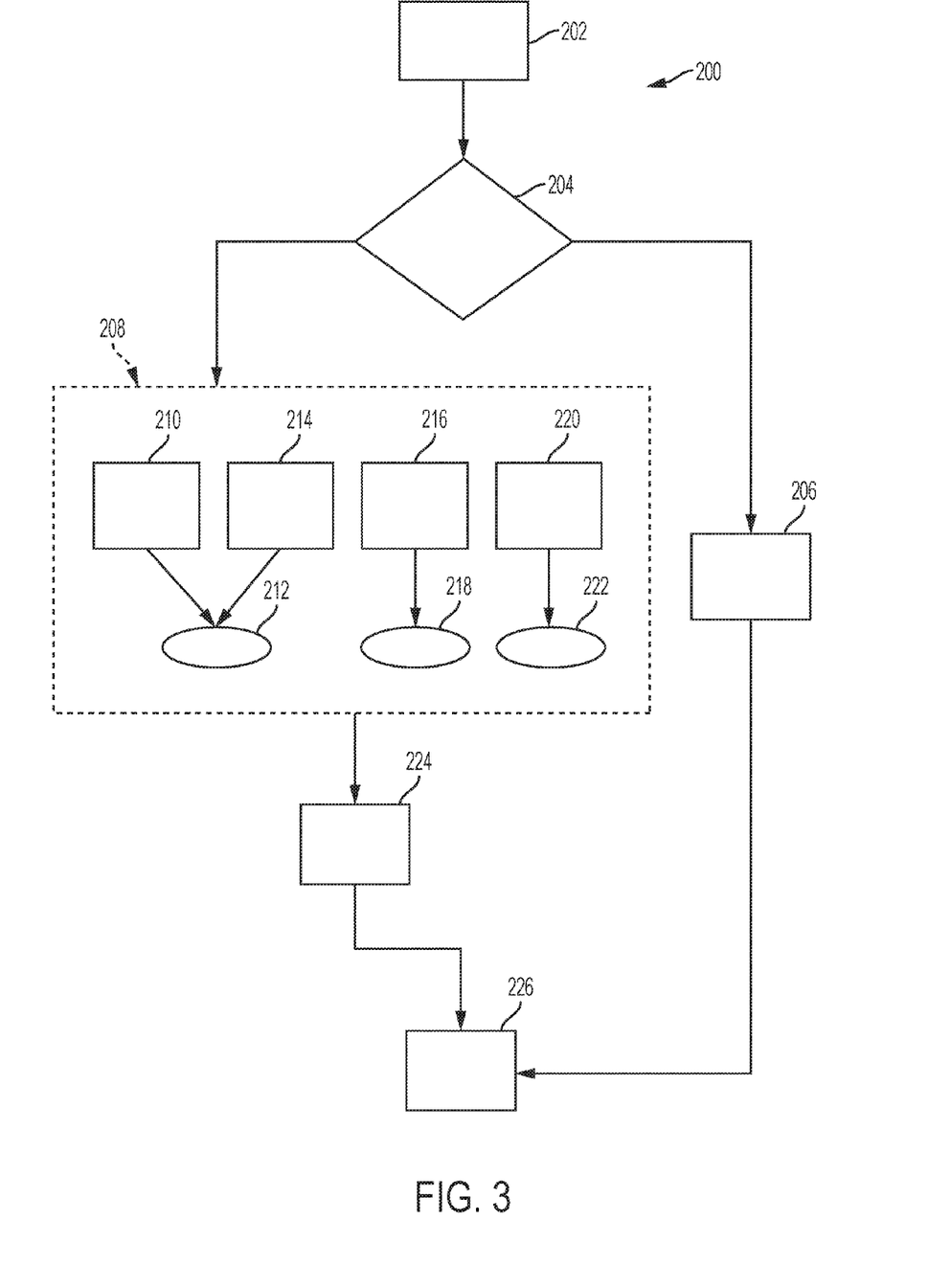
FIG. 3 schematically shows a block diagram of a CVT control system that can be employed to adjust the variator speed ratio in a CVT to control the CVT, in accordance with the disclosure.

The control system 10 of FIG. 1 may be programmed to execute the steps of the method as defined in FIG. 3 and as discussed in greater detail below. Referring now to FIG. 3, a flowchart of the method 200 stored on an instruction set and executable by the controller of the control system is shown. It is understood that method 200 need not be applied in the specific order recited herein. Furthermore, it is to be understood that some steps may be eliminated.

Method 200 may begin with step or block 202, where the control system may be programmed or configured to monitor and detect the operating state of the vehicle. The one or more sensors or sensing devices cooperate with the control system to monitor the operational state of the vehicle. The one or more sensors monitoring at least one vehicle operation state may include, but not be limited to vehicle speed, engine speed, torque converter turbine speed, CVT variator input speed, CVT variator output speed, brake pedal actuation, accelerator pedal actuation, TCM gear state, vehicle acceleration, engine acceleration and wheel speed sensors. The control system may identify an initial variator speed ratio and evaluate the desired variator speed ratio, which may be determined based upon monitored and estimated operating conditions related to an output power command, vehicle speed, engine torque, and other factors, using a variety of sensors to evaluate speed ratio parameters to identify the CVT input speed and the CVT output speed as described above.

At step or block 204, the control system detects and determines whether a critical vehicle event exists or a vehicle maneuver may be executed that could potentially disrupt or damage the CVT. In one embodiment of the disclosure, the control system monitors criteria related to certain types of vehicle events or driver actions that may damage the CVT, including, but not be limited to, a generalized road disturbance, a sudden stop or deceleration of the vehicle, a loss of vehicle traction such as a wheel slip event or the like, or a rolling direction change of the vehicle.

If the control system does not identify the existence or execution of a critical vehicle maneuver or event, the control system transmits feed forward instructions to the CVT with a desired variator speed ratio for operation of the CVT at step or block 206. Should the one or more sensors detect the existence or execution of a critical vehicle maneuver or event, the control system in electrical communication with the one or more sensors, at step or block 208, will evaluate the sensor feedback to identify the event or maneuver and adjust operation of the CVT as will be described in greater detail below. Step or block 208 generally represents a compensation strategy used by the control system to identify the type of critical event or maneuver and apply at least one control element to the variator assembly of the CVT to avoid damage or abuse to the CVT.

In one embodiment of the disclosure, the detection strategy of the control system identifies a generalized road disturbance as the critical event that effects the operation of the vehicle at step or block 210. A generalized road disturbance may include one or more of the non-limiting events, such as operation of the vehicle across uneven road conditions, gravel or dirt roads, railroad crossings, potholes and the like in a period of time. The control system detects the generalized road disturbance condition based upon feedback from the one or more sensors that identify acceleration of the vehicle in combination with an impact event in a defined period of time.

Upon identification of the generalized road disturbance event, the control system will instruct corrective action to protect the variator assembly of the CVT at step or block 212. The control system may instruct the variator assembly to overclamp the belt to limit the variator speed ratio to a range of travel based on the initial variator speed ratio at the point of entry to the event. The adjusted variator speed ratio may be limited to a range biased higher than the initial variator speed ratio to avoid applying more torque at the wheels thereby exacerbating the traction event. The adjustment of the variator speed ratio in the CVT may have a similar effect to a downshift in a step gear transmission to protect the CVT from damage.

In another embodiment of the disclosure, the detection strategy of the control system identifies a loss of wheel traction as the critical event that effects the operation of the vehicle at step or block 214. A loss of wheel traction may include one or more of the following non-limiting events, such as a loss of wheel traction based on the wheel interaction with an ice, snow, gravel or split friction surface. It is understood that the control system may detect multiple conditions to achieve the results of the disclosure, such as the identification of a sudden deceleration of the vehicle combined with the loss of traction.

The control system may monitor and detect the loss of wheel traction by evaluating the differential between wheel speeds, which may be identified as wheel slip, to determine if a threshold has been exceeded between the driven and nondriven wheels. In another non-limiting embodiment of the disclosure, the control system may identify and classify loss of traction events based on individual wheel speeds or use of individual wheel speeds and vehicle acceleration to identify a loss of traction event.

Upon identification of the loss of wheel traction, the control system will instruct corrective action to mitigate damage or abuse to the CVT and protect the variator assembly of the CVT as shown in step or block 212. As described above, the control system may instruct the variator assembly to overclamp the belt to adjust the variator speed ratio to a range of travel based on the initial variator speed ratio at the point of entry to the event. The adjusted variator speed ratio may be limited to a range biased higher than the initial variator speed ratio to avoid applying more torque at the wheels thereby exacerbating the traction event. The adjustment of the variator ratio in the CVT may have a similar effect to a downshift in a step gear transmission to protect the CVT from damage.

In yet another embodiment of the disclosure, the detection strategy of the control system identifies a significant deceleration of the vehicle in a defined period of time as the critical event that effects the operation of the vehicle at step or block 216. A sudden or significant deceleration of the vehicle event may include one or more of the following non-limiting events, such as a vehicle collision or application of the brakes causing a reduction of speed within the period of time that may increase stress of the pulleys or cause the belt or chain of the CVT to slip and damage the variator assembly.

The control system may monitor the braking system of the vehicle by examining the brake pedal actuation or application percentage and rate of change of the brake pedal actuation or application coupled with other criteria such as the thresholds on the transmission turbine speed at the time of entry. Alternatively, the control system may monitor engine acceleration or vehicle acceleration to identify a deceleration below a threshold. The control system may evaluate factors including whether the vehicle is in a forward or reverse gear, the vehicle speed to determine that the vehicle is above a speed to indicate the vehicle is in motion and that the accelerator pedal may be below a threshold to indicate that the driver does not wish to propel the vehicle.

Upon identification of the deceleration event, the control system will instruct corrective action to protect the variator assembly of the CVT at step or block 218. The control system may instruct the immediate reduction of the variator assembly to an adjusted variator speed ratio or the minimum prescribed variator speed ratio to prevent the variator speed ratio from remaining high after the event as the variator assembly cannot change unless the vehicle is moving.

In yet another embodiment of the disclosure, the detection strategy of the control system identifies a rolling direction change of the vehicle in a defined period of time as the critical event that effects the operation of the vehicle at step or block 220. A rolling direction change of the vehicle event may include a driver direction request that may be out of the range for the current vehicle speed, including, but not limited to, the driver switching the transmission of the vehicle into drive mode while the vehicle is moving in an intended rearward direction, the driver switching transmission of the vehicle into reverse mode while the vehicle is moving in an intended forward direction, movement of the vehicle from a parked condition or a shift of the transmission of the vehicle from a neutral mode to a drive or reverse more while the accelerator pedal is actuated.

The control system may monitor the TCM of the transmission of the vehicle to determine the position of the transmission in combination with the detection of the speed of the vehicle. The control system may identify a rolling direction change if the transmission is placed in a reverse mode and the vehicle speed may be positive above a calibratable threshold. Alternatively, the control system may identify a rolling direction change if the transmission is placed in a drive mode and the vehicle speed is negative below a calibratable threshold. In yet another alternative, the control system may identify a rolling direction change if the transmission is moved from a neutral mode to a drive mode or reverse mode with either high accelerator pedal actuation or high engine speed conditions.

Upon identification of the rolling direction change event, the control system will instruct corrective action to protect the variator assembly of the CVT at step or block 222. The control system monitors the TCM for a vehicle speed threshold to determine if the speed may be out of range for the drive or reverse modes. If the vehicle speed threshold is exceeded for the transmission, the control system will instruct a drive/reverse mode clutch lockout signal.

In an alternative embodiment of the disclosure, if the vehicle speed is below a set threshold and the transmission is placed in a neutral mode or the clutch control out of range lockout is active, the control system will instruct the CVT to adopt a minimum variator speed ratio or adjusted variator speed ratio. Alternatively, if the vehicle speed is above a set threshold and the transmission is placed in the neutral mode or the clutch control out of range lockout is active, the control system will perform variator speed ratio matching based on engine speed, input pulley speed and the commanded ratio dictated by the vehicle speed map such that when the driver is within acceptable range for a transmission mode, the adjusted variator speed ratio may be already commanded to the expected variator speed ratio.

At step or block 224, the control system, based upon detection of the critical event or maneuver, applies the corrective action identified in block 208 to set the appropriate limit ratio or adjusted variator speed ratio from the compensation strategy to correct for the critical event. The adjusted variator speed ratio from block 224 or approved limit variator speed ratio from step or block 206 are transmitted to the CVT at step or block 226 to apply the desired variator speed ratio to the CVT.

The controller 12 of the control system 10 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method for controlling a continuously variable transmission (CVT) for a vehicle including a variator assembly comprising:
    monitoring an operational state of the vehicle with a control system having at least one controller and one or more sensors in communication with the at least one controller;
    determining an initial variator speed ratio of the variator assembly;
    detecting at least one event causing a change in the operational state of the vehicle from the group consisting of a generalized road disturbance, a loss of wheel traction, a sudden deceleration of the vehicle and a rolling change of direction of the vehicle;
    determining a compensation strategy with the control system to adjust the variator speed ratio in response to the change in the operational state of the vehicle, including detecting the at least one event with the one or more sensors;
    generating an adjustment to the initial variator speed ratio by overclamping a variator belt to limit the variator speed ratio to create an adjusted variator speed ratio based upon the compensation strategy;
    transmitting the adjusted variator speed ratio in response to the event change in the operational state of the vehicle to the variator assembly; and
    maintaining the adjusted variator speed ratio responsive to the compensation strategy until cessation of the at least one event.

2. The method of claim 1 wherein the step of monitoring the operational state of the vehicle further comprises monitoring at least one vehicle operation state from a group consisting of vehicle speed, engine speed, torque converter turbine speed, CVT variator input speed, CVT variator output speed, brake pedal actuation, accelerator pedal actuation, transmission control module (TCM) gear state, vehicle acceleration, engine acceleration and wheel speed.

3. The method of claim 1 wherein the step of determining the compensation strategy in response to the change in the operational state of the vehicle further comprises detecting vehicle acceleration in response to the vehicle interacting with a generalized road disturbance event with the one or more sensors in a defined period of time.

4. The method of claim 1 wherein the step of determining the compensation strategy in response to the change in the operational state of the vehicle further comprises detecting wheel speed in response to a loss of wheel traction event with the one or more sensors in a defined period of time.

5. The method of claim 4 wherein the step of detecting wheel speed further comprises detecting a differential between wheel speeds with the one or more sensors to determine if a threshold has been exceeded between the driven and nondriven wheels.

6. The method of claim 4 wherein the step of detecting wheel speed further comprises detecting individual wheel speeds and vehicle acceleration with the one or more sensors to identify a loss of wheel traction event.

7. The method of claim 1 wherein the step of determining the compensation strategy in response to the change in the operational state of the vehicle further comprises detecting a brake pedal actuation, rate of change of the brake pedal actuation and a transmission turbine speed in response to a vehicle deceleration event with the one or more sensors at a time of entry of a defined period of time.

8. The method of claim 1 wherein the step of determining the compensation strategy in response to the change in the operational state of the vehicle further comprises monitoring a transmission control module to determine a transmission mode and vehicle speed in response to a rolling direction change event with the one or more sensors in a defined period of time.

9. The method of claim 8 further comprising monitoring the transmission control module to identify if the transmission is placed in a drive mode when the vehicle speed is negative below a calibratable threshold.

10. A continuously variable transmission (CVT) for a vehicle, comprising:
   a variator assembly including a first pulley and a second pulley, the first and second pulleys rotatably coupled by a flexible continuous rotatable device, wherein the first pulley is rotatably coupled to an input member and the second pulley is rotatably coupled to an output member;
   the first pulley including a moveable sheave that is translated along a first axis relative to a stationary sheave in response to urging of a first actuator;
   the second pulley including a moveable sheave that is translated along a second axis relative to a stationary sheave in response to urging of a second actuator; and
   a control system having at least one controller and one or more sensors in communication with the at least one controller, the control system including an instruction set, the instruction set executable to:
      determine an initial variator speed ratio of the variator assembly,
      detect at least one event causing a change in an operational state of the vehicle from the group consisting of a generalized road disturbance, a loss of wheel traction, a sudden deceleration of the vehicle and a rolling change of direction of the vehicle,
      determine a compensation strategy to adjust the variator speed ratio in response to the change in the operational state of the vehicle, including detecting the at least one event with the one or more sensors,
      generate an adjustment to the initial variator speed ratio by overclamping a variator belt to limit the variator speed ratio to create an adjusted variator speed ratio based upon the compensation strategy,
      transmit an adjusted variator speed ratio in response to the event change in the operational state of the vehicle to the variator assembly, and
      maintain the adjusted variator speed ratio responsive to the compensation strategy until cessation of the at least one event.

11. The CVT of claim 10, wherein the control system monitors at least one vehicle operation state from a group consisting of vehicle speed, engine speed, torque converter turbine speed, CVT variator input speed, CVT variator output speed, brake pedal actuation, accelerator pedal actuation, transmission control module (TCM) gear state, vehicle acceleration, engine acceleration and wheel speed.

12. The CVT of claim 10 wherein the instruction set of the control system is executable to determine the compensation strategy in response to the change in the operational state of the vehicle to detect vehicle acceleration in response to the vehicle interacting with a generalized road disturbance event with the one or more sensors in a defined period of time.

13. The CVT of claim 10 wherein the instruction set of the control system is executable to determine the compensation strategy in response to the change in the operational state of the vehicle to detect wheel speed in response to a loss of wheel traction event with the one or more sensors in a defined period of time.

14. The CVT of claim 10 wherein the instruction set of the control system is executable to determine the compensation strategy in response to the change in the operational state of the vehicle to detect brake pedal actuation, rate of change of the brake pedal actuation and transmission turbine speed in response to a vehicle deceleration event with the one or more sensors at a time of entry of a defined period of time.

15. The CVT of claim 10 wherein the instruction set of the control system is executable to determine the compensation strategy in response to the change in the operational state of the vehicle to monitor a transmission control module to determine a transmission mode and vehicle speed in response to a rolling direction change event with the one or more sensors in a defined period of time.

16. A vehicle comprising:
   an internal combustion engine;
   a continuously variable transmission (CVT) comprising:
      an input member;
      an output member;
      a variator assembly including a first pulley and a second pulley, the first and second pulleys rotatably coupled by a flexible continuous rotatable device, wherein the first pulley is rotatably coupled to the input member and the second pulley is rotatably coupled to the output member;
      the first pulley including a moveable sheave that is translated along a first axis relative to a stationary sheave in response to urging of a first actuator;
      the second pulley including a moveable sheave that is translated along a second axis relative to a stationary sheave in response to urging of a second actuator; and
      a control system having at least one controller and one or more sensors in communication with the at least one controller, the control system including an instruction set, the instruction set executable to:
         determine an initial variator speed ratio of the variator assembly,
         detect at least one event causing a change in an operational state of the vehicle from the group consisting of a generalized road disturbance, a loss of wheel traction, a sudden deceleration of the vehicle and a rolling change of direction of the vehicle,
         determine a compensation strategy to adjust the variator speed ratio in response to the change in the operational state of the vehicle, including detecting the at least one event with the one or more sensors,
         generate an adjustment to the initial variator speed ratio by overclamping a variator belt to limit the variator speed ratio to create an adjusted variator speed ratio based upon the compensation strategy,
         transmit feed-forward control of the adjusted variator speed ratio responsive to the compensation strategy in response to the event change in the operational state of the vehicle to the variator assembly, and
         maintain the adjusted variator speed ratio responsive to the compensation strategy until cessation of the at least one event.

17. The vehicle of claim 16, wherein the control system monitors at least one vehicle operation state from a group consisting of vehicle speed, engine speed, torque converter turbine speed, CVT variator input speed, CVT variator output speed, brake pedal actuation, accelerator pedal actuation, transmission control module (TCM) gear state, vehicle acceleration, engine acceleration and wheel speed to detect the event causing a change in the operational state of the vehicle.

* * * * *